(12) United States Patent
Liu et al.

(10) Patent No.: US 12,190,508 B2
(45) Date of Patent: Jan. 7, 2025

(54) SYSTEMS AND METHODS FOR ENHANCING MEDICAL IMAGES

(71) Applicant: SHANGHAI UNITED IMAGING INTELLIGENCE CO., LTD., Shanghai (CN)

(72) Inventors: Yikang Liu, Cambridge, MA (US); Shanhui Sun, Lexington, MA (US); Terrence Chen, Lexington, MA (US); Zhang Chen, Brookline, MA (US); Xiao Chen, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 384 days.

(21) Appl. No.: 17/726,383

(22) Filed: Apr. 21, 2022

(65) Prior Publication Data
US 2023/0342916 A1 Oct. 26, 2023

(51) Int. Cl.
*G06T 7/00* (2017.01)
*G06T 5/90* (2024.01)
*G06T 7/10* (2017.01)

(52) U.S. Cl.
CPC .............. *G06T 7/0012* (2013.01); *G06T 5/90* (2024.01); *G06T 7/10* (2017.01); *G06T 2207/10116* (2013.01); *G06T 2207/20084* (2013.01)

(58) Field of Classification Search
CPC .......... G06T 7/0012; G06T 5/90; G06T 7/10; G06T 2207/10116; G06T 2207/20084; G06T 5/73; G06T 5/94; G06T 7/11; G06T 7/194; G06T 2207/10121; G06T 2207/30021; G06T 2207/30101; G06T 7/136; G06T 2207/20081;
(Continued)

(56) References Cited

U.S. PATENT DOCUMENTS 9,855,384 B2  1/2018 Cohen et al.
10,964,017 B2  3/2021 Pack et al.
(Continued)

FOREIGN PATENT DOCUMENTS

CN  106920227 B  7/2017
CN  107292887 B  10/2017
CN  106157320 B  2/2019
(Continued)

*Primary Examiner* — Ping Y Hsieh
(74) *Attorney, Agent, or Firm* — Zhong Law, LLC

(57) ABSTRACT

Described herein are systems, methods, and instrumentalities associated with medical image enhancement. The medical image may include an object of interest and the techniques disclosed herein may be used to identify the object and enhance a contrast between the object and its surrounding area by adjusting at least the pixels associated with the object. The object identification may be performed using an image filter, a segmentation mask, and/or a deep neural network trained to separate the medical image into multiple layers that respectively include the object of interest and the surrounding area. Once identified, the pixels of the object may be manipulated in various ways to increase the visibility of the object. These may include, for example, adding a constant value to the pixels of the object, applying a sharpening filter to those pixels, increasing the weight of those pixels, and/or smoothing the edge areas surrounding the object of interest.

20 Claims, 6 Drawing Sheets

(58) Field of Classification Search
CPC ........... G06T 2207/20104; G06T 2207/30004; G06N 3/084
See application file for complete search history.

(56) References Cited

U.S. PATENT DOCUMENTS

2020/0257879 A1    8/2020  Solanki et al.
2021/0158541 A1*   5/2021  Figueroa-Alvarez ........................ G06T 7/277

FOREIGN PATENT DOCUMENTS

CN      111091573 A        5/2020
CN      111598862 B   *    5/2021    ........... G06N 3/0454

* cited by examiner

SYSTEMS AND METHODS FOR ENHANCING MEDICAL IMAGES

BACKGROUND

Medical images such as X-ray fluoroscopic images are widely used today to visualize internal human organs and/or implanted surgical devices. Because of limitations related to imaging speed and/or radiation dosage, however, medical images acquired using existing medical imaging technologies usually include a lot of noise, which affects the visibility of some structures depicted in the medical images (e.g., thin tubular structures such as blood vessels, catheters, guide wires, etc.). Therefore, there is a need to develop systems and methods that are capable of detecting and enhancing the visibility of a target structure in a medical image so as to improve the usability of the medical image.

SUMMARY

Described herein are systems, methods, and instrumentalities associated with enhancing an object of interest in a medical image. An apparatus capable of performing the image enhancement task may include one or more processors that may be configured to obtain a source medical image comprising the object of interest and a background area surrounding the object of interest, determine, from the source medical image, a first plurality of pixels associated with the object of interest and a second plurality of pixels associated with the background area, and generate a target medical image based on the first plurality of pixels and the second plurality of pixels so as to enhance the contrast between the object of interest and the background area in the target medical image. The first plurality of pixels associated with the object of interest may have respective first pixel values, the second plurality of pixels associated with the background area may have respective second pixel values, and the one or more processors may be configured to enhance the contrast between the object of interest and the background area by adjusting at least the first pixel values of the first plurality of pixels (e.g., associated with the object of interest) or the second pixel values of the second plurality of pixels (e.g., associated with the background area).

In example, the one or more processors of the apparatus described herein may be configured to determine a segmentation mask associated with the object of interest using an artificial neural network or an image filter, and determine the first plurality of pixels and the second plurality of pixels based on the segmentation mask. Once the first plurality of pixels associated with the object of interest is determined, the contrast between the object of interest and the background area may be enhanced by adjusting each of the first pixel values by a constant amount (e.g., a positive or negative constant depending on the pixel values) and/or by applying a sharpening filter (e.g., unsharp masking) to the first plurality of pixels.

In examples, the segmentation mask may include values that indicate a respective probability that each of the first plurality of pixels belongs to the object of interest. In these examples, the contrast between the object of interest and the background area may be enhanced by selecting at least a subset of the first plurality of pixels based on the respective probability that each of the first plurality of pixels belongs to the object of interest, determining a maximum pixel value among the selected pixels, and adjusting the pixel value of each of the selected pixels based on the maximum pixel value and the respective probability that each of the selected pixels belongs to the object of interest.

In examples, the one or more processors of the apparatus described herein may be configured to separate the source medical image into a first layer and a second layer using a pre-trained a machine learned (ML) model. The first layer may include the object of interest, the second layer may include the background area, and the one or more processors may be configured to determine the first plurality of pixels based on the first layer and determine the second plurality of pixels based on the second layer. In examples, the one or more processors may be further configured to determine respective weights of the first layer and the second layer in the source medical image, and enhance the contrast between the object of interest and the background area by increasing the weight of the first layer in the target medical image or decreasing the weight of the second layer in the target medical image. The weight of the first layer may be increased in the target medical image, for example, by multiplying the respective first pixel values of the first plurality of pixels in the target medical image by a value that is greater than the weight of the first layer in the source medical image. The weight of the second layer may be decreased in the target medical image, for example, by multiplying the respective second pixel values of the second plurality of pixels in the target medical image by a value that is smaller than the weight of the second layer in the source medical image.

In examples, the ML model used to separate the source medical image may be trained using paired medical images that include a first medical image and a second medical image, wherein the first medical image may include a depiction of the object of interest at a first time, the second medical image may include a depiction of the object of interest at a second time, and the ML model may be trained based on at least a motion of the object of interest from the first time to the second time.

While embodiments of the present disclosure may be described herein using X-ray images and tubular anatomical or artificial structures as examples, those skilled in the art will appreciate that the techniques disclosed herein may also be used to enhance other types of medical images and/or other types of objects.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings.

Figure 1:
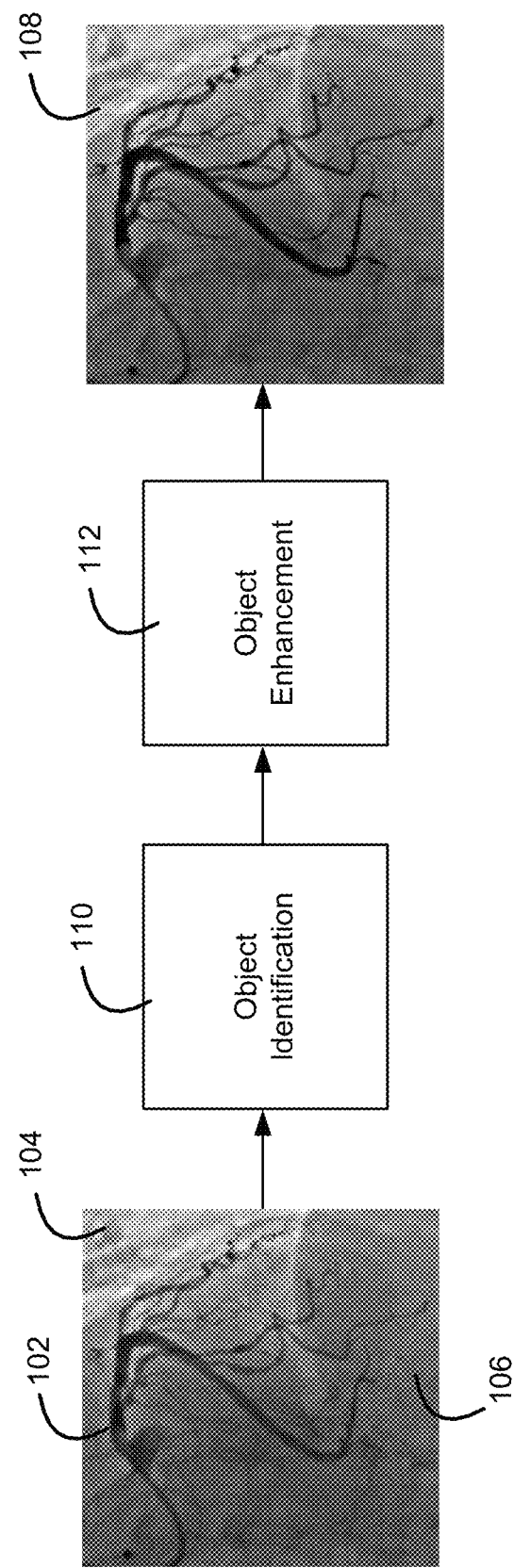
FIG. 1 is a diagram illustrating an example of enhancing an object of interest in a medical image in accordance with one or more embodiments of the disclosure provided herein.

FIG. 1 illustrate an example of enhancing an object of interest 102 in a medical image 104 in accordance with one or more embodiments of the present disclosure. As shown, medical image 104 (e.g., a source medica image) may include a medical scan image such as an X-ray fluoroscopic image of a human body and object of interest 102 may include an anatomical structure of the human body and/or an artificial device that may be surgically inserted into the human body. For instance, in some examples, object of interest 102 may include one or more tubular structures such as one or more blood vessels (e.g., coronary arteries), catheters, guide wires, etc., and in other examples, object of interest 102 may include one or more non-tubular structures such as the left ventricle, the myocardium, etc. In addition to object of interest 102, medical image 104 may also include a background area 106 that may surround the object of interest and exhibit a contrast with the object of interest that may enable a medical professional to distinguish the object of interest from the background. Due to limitations associated with imaging speed and/or radiation dosage, however, the contrast between object of interest 102 and background area 106 may not be as clear or distinguishable as desired and therefore various techniques may be needed to enhance the object of interest in a target medical image 108 such that structural details of the object of interest may be readily discernable to the human eyes.

In accordance with one or more embodiments of the present disclosure, the contrast between object of interest 102 and background area 106 (e.g., the visibility of the object of interest) may be enhanced by identifying the object of interest at 110 (e.g., using a first set of computer vision and/or machine-learning (ML) based techniques) and enhancing the object of interest at 112 (e.g., using a second set of computer vision and/or ML techniques). In examples, identifying the object of interest at 110 may include determining, from source medical image 104, a first plurality of pixels associated with object of interest 102 and a second plurality of pixels associated with background area 106. The first plurality of pixels may be associated with respective first pixel values (e.g., each such pixel value may range from 0 to 255) and the second plurality of pixels may be associated with respective second pixel values (e.g., each such pixel value may also range from 0 to 255). Based on the determined first and/or second plurality of pixels, the contrast between object of interest 102 and background area 106 may be enhanced (e.g., in target medical image 108) by adjusting the first pixel values associated with the first plurality of pixels and/or the second pixel values associated with the second plurality of pixels. For instance, the contrast between object of interest 102 and background area 106 may be enhanced in target medical image 108 by adjusting the first pixel values associated with the object of interest by a first amount (e.g., a first constant value) while maintaining the second pixel values associated with the background area, by adjusting the second pixel values associated with the background area by a second amount (e.g., a second constant value) while maintaining the first pixel values associated with the object of interest, by adjusting the first pixel values associated with the object of interest and the second pixel values associated with the background area by different values, etc.

The adjustment amount or value described herein may be a positive or a negative value depending on, for example, the respective colors/shades that are used to represent the object of interest and the background area. For example, if object of interest 102 is depicted with a lighter color (e.g., having higher pixel values) against a darker background (e.g., having lower pixels values), the contrast between the object of interest and the background may be enhanced by adding a positive constant value to the pixels of the object of interest and/or adding a negative constant value to the pixels of the background area. Conversely, if object of interest 102 is depicted with a darker color (e.g., having lower pixel values) against a lighter background (e.g., having higher pixels values) in the images, the contrast between the object of interest and the background may be enhanced by adding a negative constant value to the pixels of the object of interest and/or adding a positive constant value to the pixels of the background area.

Other techniques may also be used to manipulate the pixel values of object of interest 102 and/or the pixel values of background area 106 so as to enhance the object of interest in target image 108. These techniques may include, for example, applying a sharpening filter (e.g., unsharp masking) to the plurality of pixels associated with the object of interest, adjusting the pixel values of at least a subset of the pixels associated with the object of interest while maintaining the maximum pixel values associated with the object, increasing the weight of the pixel values associated with the object of interest in the target image, etc. Greater details about these techniques will be provided below in conjunction with the description of techniques for separating (e.g., identifying) an object of interest and a background area in a medical image. It should also be noted here that while embodiments of the present disclosure may be described herein using X-ray fluoroscopy and/or tubular structures as examples, the relevant techniques may also be applied to enhance other types of medical images (e.g., computerized tomography (CT) images, magnetic resonance imaging (MRI) images, etc.) and/or other types of structures (e.g., non-tubular structures). Further, systems, methods, and instrumentalities employing the techniques described herein may additionally provide a user interface through which a user may switch between an original image (e.g., source medical image 104) and an enhanced image (e.g., target medical image 108) based on the user's needs.

Figure 2:
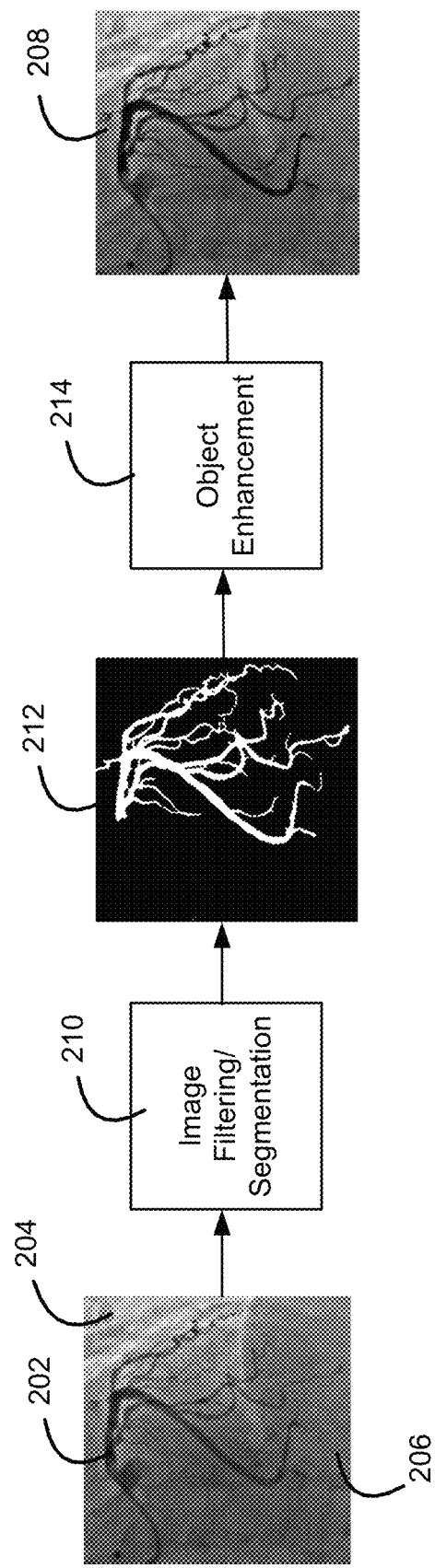
FIG. 2 is a diagram illustrating an example of identifying and enhancing an object of interest in a medical image in accordance with one or more embodiments of the disclosure provided herein.

FIG. 2 illustrates an example of identifying and enhancing an object of interest 202 (e.g., object of interest 102 in FIG. 1) based on a source medical image 204 (e.g., medical image 104 of FIG. 1) in accordance with one or more embodiments of the present disclosure. As shown, object of interest 202 may be identified from medical image 204 (e.g., separated from a background area 206) by applying one or more image filtering and/or segmentation techniques to the medical image at 208 and generating a probability mask (e.g., a segmentation mask) indicating the object of interest at 212. Various image filters (e.g., such as a Frangi or hybrid Hessian filter) and/or ML models (e.g., learned using a deep neural network) may be utilized to accomplish these goals. For example, a segmentation neural network may be trained to extract image features associated with the object of interest and generate a segmentation mask (e.g., shown as 212 in FIG. 2) to indicate the area (e.g., pixels) of medical image 204 that corresponds to the object of interest. The segmentation neural network may include a convolutional neural network (CNN) having multiple convolutional layers, one or more pooling layers, and/or one or more fully-connected layers. The convolutional layers may be followed by batch normalization and/or linear or non-linear activation (e.g., such as a rectified linear unit or ReLU activation function). Each of the convolutional layers may include a plurality of convolution kernels or filters with respective weights, the values of which may be learned through a training process such that features associated with the object of interest may be extracted from medical image 204 using the convolution kernels or filters upon completion of the training. These extracted features may be down-sampled through one or more pooling layers to obtain a representation of the features, for example, in the form of a feature map or a feature vector. In some examples, the neural network may also include one or more un-pooling layers and one or more transposed convolutional layers. Through the un-pooling layers, the network may up-sample the features extracted from medical image 204 and process the up-sampled features through the one or more transposed convolutional layers (e.g., via a plurality of deconvolution operations) to derive an up-scaled or dense feature map or feature vector. The dense feature map or vector may then be used to predict areas (e.g., pixels) in medical image 204 that may belong to object of interest 202. The prediction may be represented by segmentation mask 212, which may include a respective probability value (e.g., ranging from z to 1) for each image pixel that indicates whether the image pixel may belong to object of interest 202 (e.g., having a probability value above a preconfigured threshold) or background area 206 (e.g., having a probability value below a preconfigured threshold).

Once object of interest 202 is identified using the techniques described above, the object (e.g., the contrast between object 202 and background 206) may be enhanced at 214 by adjusting the pixels associated with the object and/or the surrounding background based on the color/brightness values (e.g., RGB values) of the pixels and/or the probability that each pixel belongs to the object of interest or the background. The adjusted pixels may then be used to generate a target medical image 208 (e.g., target image 108 of FIG. 1) comprising the enhanced object of interest. As described above, the contrast between the object of interest and its surrounding area (e.g., background 206) may be enhanced by adding a value (e.g., a positive or negative constant) to the pixels that belong to the object of interest. The contrast between the object of interest and its surrounding area may also be enhanced by applying a sharpening filter (e.g., unsharp masking) to the object of interest (e.g., to sharpen the object of interest in target image 208). Such a sharpening filter (or unsharp masking) may be applied, for example, by filtering source medical image 204 (e.g., through a lowpass filter such as a Gaussian filter) to obtain a blurred or smoothed version of the image, subtracting the blurred image from source medical image 204 (e.g., to yield a high-pass or edge representation of the source image), and adding the result of the subtraction back to source medical image 204 to obtain target medical image 208 (e.g., with sharpened edges).

The contrast between object of interest 202 and background area 206 may also be enhanced by manipulating at least a subset of the pixels associated with the object of interest in accordance with the following.

$$\text{foreground\_pixels} \leftarrow \text{all\_pixels[probability>threshold]} \quad \quad 1)$$

$$\text{foreground\_pixels\_stretch} \leftarrow \text{foreground\_pixels.max( )} - a^*(\text{foreground\_pixels.max( )} - \text{foreground\_pixels}) \quad \quad 2)$$

$$\text{foreground\_pixels} \leftarrow \text{probability}^*\text{foreground\_pixels\_stretch} + (1\text{-probability})^*\text{foreground\_pixels} \quad \quad 3)$$

$$\text{all\_pixels[probability>threshold]} \leftarrow \text{foreground\_pixels} \quad \quad 4)$$

where "probability" may represent the probability of a pixel being associated with the object of interest (e.g., based on probability or segmentation mask 212), all_pixels [probability>threshold] may represent a set of pixels whose "probability" of being associated with the object of interest is above the "threshold" (e.g., which may be configurable), foreground_pixels.max( ) may represent the maximum pixel value among the set of pixels represented by all_pixels [probability>threshold], "a" may be a constant whose value may be configurable, and (foreground_pixels.max( )-foreground_pixels) may represent a difference between the maximum pixel value and the pixel value of each of foreground_pixels. Thus, using Equations 1)-4), the pixel values of at least a subset of the pixels of source medical image 204 (e.g., those having a certain likelihood of being associated with the object of interest) may be adjusted in proportion to the difference between each pixel value and the maximum pixel value before a weighted sum is calculated (e.g., using "probability" as the weight) based on the adjusted pixel value and original pixel value to smooth the edges around the object of interest.

It should be noted that although the techniques for identifying or enhancing the object of interest are described herein individually, one or more of these techniques may be applied together to improve the results of the operations. For example, to enhance the contrast between object of interest 202 and background 206, a sharpening filter (e.g., unsharp masking) may be applied together with the operations illustrated in Equations 1)-4) to not only emphasize the fine details of the object of interest but also smooth the edges surrounding the object of interest.

In examples, the object enhancement task described herein may be accomplished by separating a source medical image (e.g., image 104 in FIG. 1 or image 204 in FIG. 2) into multiple (e.g., two) layers, identifying an object of interest in one of the layers, and enhancing the identified object in a target medical image. The separation of the layers may satisfy the following condition: $I(t)=w^*I_1(t)+(1-w)^*I_2(t)$, where $I(t)$ may represent the source medical image at time t, $I_1(t)$ may represent a first layer of the source medical image that may include the object of interest, $I_2(t)$ may represent a second layer of the source medical image that may include a background area surrounding the object of interest, and w may represent the weight of the first layer in the source medical image. Using these layers, enhancement of the object of interest may be accomplished by increasing the value of w (e.g., the weight of the first layer that includes the object of interest) in a target medical image (e.g., target image 108 in FIG. 1 or target image 208 in FIG. 2) based on the following:

$$I_e(t)=w'^*I_1(t)+(1-w)^*I_2(t) \quad \quad 5)$$

where $I_e(t)$ may represent the target medical image and w' may represent an increased weight (e.g., w'>w) applied to the first layer in the target medical image (e.g., by multiplying the pixel values of the object of interest by w'). While Equation 5) shows that the weight of the second layer may remain the same in the target medical image as in the source medical image, those skilled in the art will appreciate that the weight of the second layer may also be decreased in the target medical image (e.g., by multiplying the pixel values of the background by a value that is smaller than (1−w)) to further enhance the contrast between the object of interest and the background.

Figure 3:
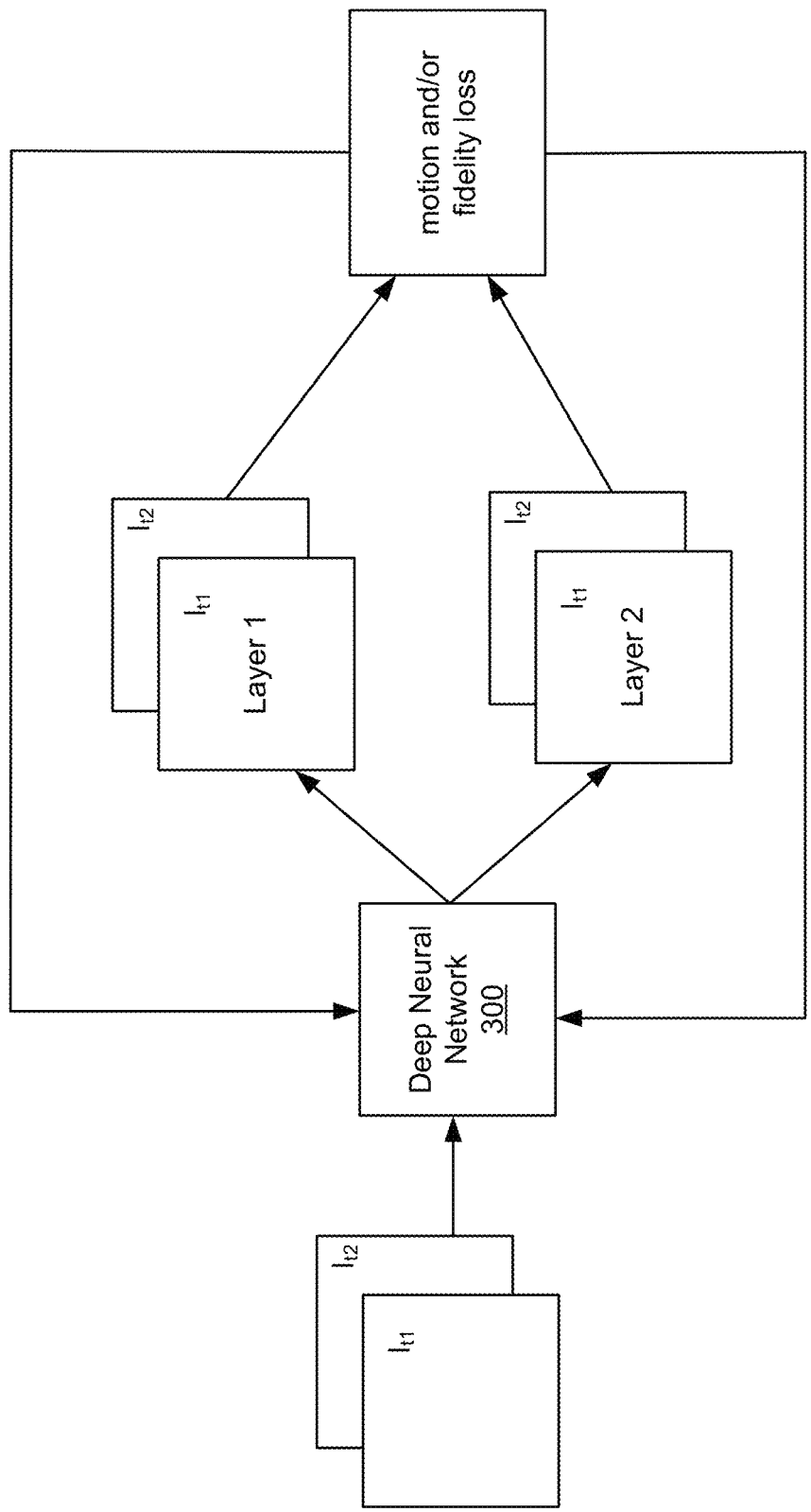
FIG. 3 is a diagram illustrating an example of training a deep neural network to separate a medical image into two layers in accordance with one or more embodiments of the disclosure provided herein.

The separation of a source medical image into multiple layers may be performed using various image processing techniques. FIG. 3 illustrates an example of using a deep neural network (DNN) to separate a source medical image into two layers (e.g., Layer 1 and Layer 2), where a first layer may include an object of interest and a second layer may include a background that surrounds the object of interest. The DNN (e.g., 300 shown in FIG. 3) may include a convolutional neural network having multiple convolutional layers, one or more pooling layers, and/or one or more fully-connected layers. The convolutional layers may be followed by batch normalization and/or linear or non-linear activation (e.g., such as a rectified linear unit or ReLU activation function). Each of the convolutional layers may include a plurality of convolution kernels or filters with respective weights, the values of which may be learned through a training process such that features associated with the object of interest and/or a background area may be extracted from a source medical image using the convolution kernels or filters upon completion of the training. These extracted features may be down-sampled through one or more pooling layers to obtain a representation of the features, for example, in the form of a feature map or a feature vector. In some examples, DNN 300 may also include one or more un-pooling layers and one or more transposed convolutional layers. Through the un-pooling layers, the network may up-sample the features extracted from the source medical image and process the up-sampled features through the one or more transposed convolutional layers (e.g., via a plurality of deconvolution operations) to derive an up-scaled or dense feature map or feature vector. The dense feature map or vector may then be used to estimate a layer of the image that may include the object of interest or the background.

DNN 300 may be trained in an unsupervised manner utilizing paired images that may be closely related in a time domain such that the images may be registered based on a small and smooth motion field. For example, the paired training images may be consecutive image frames from a medical video such as an X-ray video, a cine movie, etc., and the training of DNN 300 may be performed with an objective to achieve motion and/or fidelity regularization. As shown in FIG. 3, DNN 300 may, during a training iteration, obtain a source medical image $I_{t1}$ that may depict an object of interest at time t1, extract features from the source medical image, and estimate, based on the extracted features, two layers (e.g., Layer 1 and Layer 2) that may make up the source medical image. One of the estimated layers (e.g., Layer 1) may include the object of interest while the other one of the estimated layers (e.g., Layer 2) may include a background area that may surround the object of interest. During the same training iteration, DNN 300 may further obtain a source medical image $I_{t2}$ that depicts the object of interest at time t2, where t1 and t2 may be consecutive time spots along the time axis of a medical video from which images $I_{t1}$ and $I_{t2}$ may be obtained. DNN 300 may extract features from source medical image $I_{t2}$, and estimate, based on the extracted features, two layers (e.g., Layer 1 and Layer 2) that may make up the source medical image. Similar to image $I_{t1}$, one of the estimated layers (e.g., Layer 1) for image $I_{t2}$ may include the object of interest while the other one of the estimated layers (e.g., Layer 2) for image $I_{t2}$ may include the background area that surrounds the object of interest.

Since images $I_{t1}$ and $I_{t2}$ may be closely related with respect to time, the object of interest included in the estimated Layer 1 of image $I_{t2}$ may be expected to have a small and/or smooth motion compared to the object of interest included in the estimated Layer 1 of image $I_{t1}$. Such a motion may be represented by a motion field M and the parameters (e.g., weights) of DNN 300 may be learned by regularizing (e.g., optimizing) the motion field M based on the following:

$$\min_M (L_a(M_i(I_i(t1)),I_i(t2))+L_b(M_i)) \qquad 6)$$

wherein i may have a value of 1 or 2 representing Layer 1 or Layer 2 of a source medical image, respectively, $M_i(I_i(t1))$ may represent the transformation of image $I_i(t1)$ (e.g., Layer 1 or Layer 2 of image $I_{t1}$) in accordance with an estimated motion M between time t1 and t2, $L_a$ may be a loss function that measures a difference (e.g., a mean squared error) between transformed image $M_i(I_i(t1))$ and target image $I_i(t2)$, and $L_b$ may be a loss function for regularizing the motion field M (e.g., $L_b$ may be a combination of an L1 loss on the motion field magnitude such as L1(M) and an L1 loss on the motion field gradient magnitude such as L1(grad(M)).

In some examples, the training of DNN 300 may be conducted with an additional objective to achieve fidelity regularization (e.g., to ensure two estimated layers may be combined to match the original image) as follows:

$$\min_w (L_c(w*I_1(t)+(1-w)*I_2(t),I(t))) \qquad 7)$$

where $w*I_1(t)+(1-w)*I_2(t)$ may represent a source medical image constructed using an estimated Layer 1 (e.g., represented as $I_1(t)$) and an estimated Layer 2 (e.g., represented as $I_2(t)$), I(t) may represent the original source medical image, and $L_c$ may be a loss function that measures a difference between the constructed source image and the original source image.

As shown in FIG. 3, the motion and/or fidelity related losses calculated using the techniques described above may be backpropagated through DNN 300 (e.g., based on a gradient descent of the losses) to adjust the network parameters (e.g., weights) until one or more training criteria have been satisfied (e.g., until one or more of the losses are minimized). And once trained, DNN 300 may be used (e.g., at an inference time) to receive a medical image of a target object and separate the medical image into multiple layers that may respectively include the target object and a background area surrounding the target object.

Figure 4:
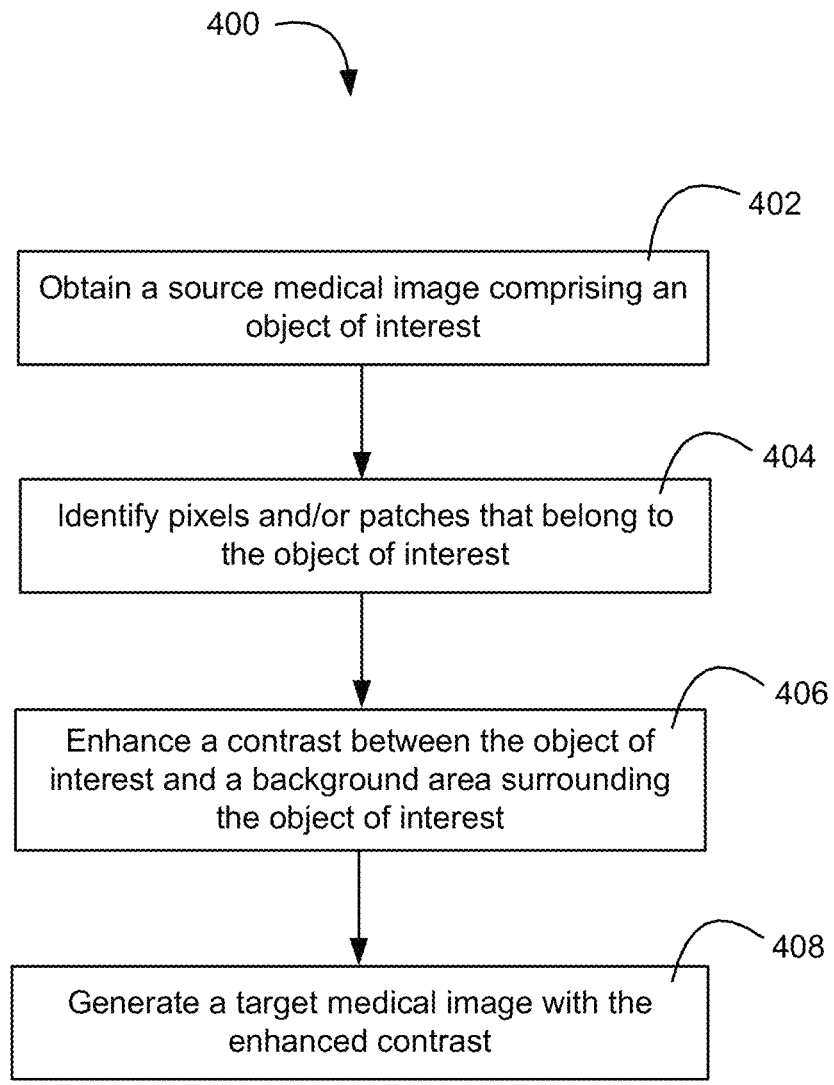
FIG. 4 is a flow diagram illustrating example operations that may be associated with enhancing an object of interest in a medical image in accordance with one or more embodiments of the disclosure provided herein.

FIG. 4 illustrate example operations 400 that may be associated with enhancing an object of interest in a medical image. The operations may be performed by a system or apparatus (e.g., such as that illustrated in FIG. 6), for example, as a post-processing step. As shown by the figure, operations 400 may include obtaining a source medical image that comprises the object of interest at 402 and identifying the object of interest (e.g., pixels or patches associated with the object of interest) at 404. The identification may be performed, for example, using an image filter and/or a pre-trained artificial neural network (ANN). As described herein, the ANN may include a segmentation network trained to generate a segmentation mask that identifies the pixels of the object of interest or a deep neural network trained to separate the source medical image into multiple layers that respectively include the object of interest and a background area surrounding the object of interest. Once the pixels and/or patches associated with the object of interest are identified, those pixels and/or patches may be enhanced at 406 to increase the contrast between the object of interest and the background area. A target medical image with the enhanced contrast and/or better visibility of the object of interest may then be generated at 408 and used to facilitate interventional procedures and/or downstream image processing tasks such as image registration (e.g., between a 2D/3D CT image and an X-ray fluoroscopic image), stent enhancement, road mapping, etc.

Figure 5:
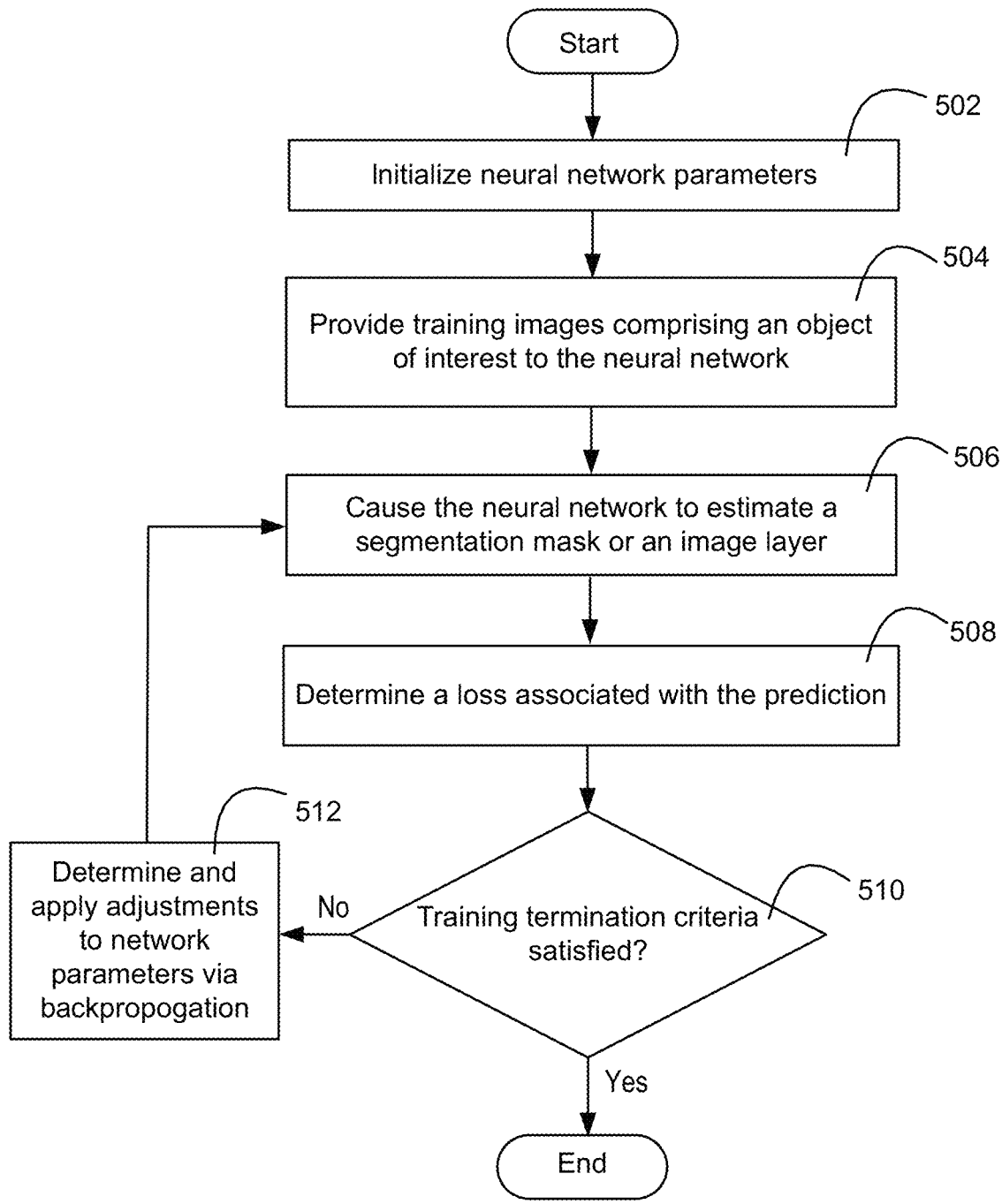
FIG. 5 is a flow diagram illustrating example operations that may be associated with training a neural network to perform one or more of the tasks described herein.

FIG. 5 illustrates example operations that may be associated with training a neural network (e.g., the segmentation neural network or layer separation DNN described herein) to perform one or more of tasks described herein. As shown, the training operations may include initializing the parameters of the neural network (e.g., weights associated with the various filters or kernels of the neural network) at 502. The parameters may be initialized, for example, based on samples collected from one or more probability distributions or parameter values of another neural network having a similar architecture. The training operations may further include providing training data (e.g., paired medical images comprising an object of interest) to the neural network at 504, and causing the neural network to estimate a segmentation mask or an image layer at 506. At 508, a loss between the estimation and a desired result may be determined using one or more suitable loss functions (e.g., such as those illustrated by Equations 6) and 7)) and the loss may be evaluated at 510 to determine whether one or more training termination criteria have been satisfied. For instance, a training termination criterion may be deemed satisfied if the loss(es) described above is below a predetermined thresholds, if a change in the loss(es) between two training iterations (e.g., between consecutive training iterations) falls below a predetermined threshold, etc. If the determination at 510 is that the training termination criterion has been satisfied, the training may end. Otherwise, the loss may be backpropagated (e.g., based on a gradient descent associated with the loss) through the neural network at 512 before the training returns to 506.

For simplicity of explanation, the training steps are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 6:
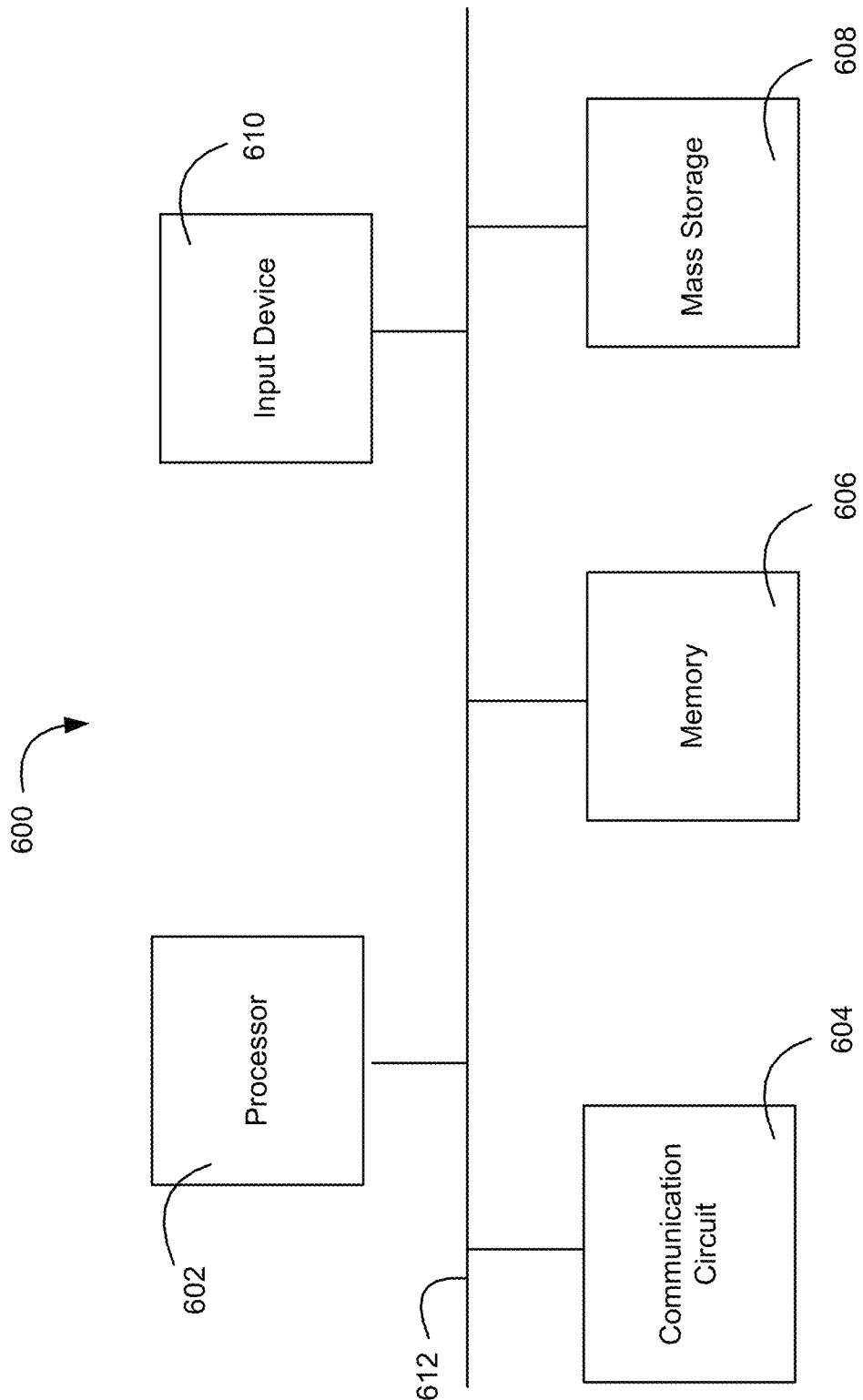
FIG. 6 is a block diagram illustrating example components of an apparatus that may be configured to perform the image enhancement tasks described herein.

The systems, methods, and/or instrumentalities described herein may be implemented using one or more processors, one or more storage devices, and/or other suitable accessory devices such as display devices, communication devices, input/output devices, etc. FIG. 6 is a block diagram illustrating an example apparatus 600 that may be configured to perform the image enhancement tasks described herein. As shown, apparatus 600 may include a processor (e.g., one or more processors) 602, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 600 may further include a communication circuit 604, a memory 606, a mass storage device 608, an input device 610, and/or a communication link 612 (e.g., a communication bus) over which the one or more components shown in the figure may exchange information.

Communication circuit 604 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 602 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 608 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 602. Input device 610 may include a keyboard, a mouse, a voice-controlled input device, a touch sensitive input device (e.g., a touch screen), and/or the like for receiving user inputs to apparatus 600.

It should be noted that apparatus 600 may operate as a standalone device or may be connected (e.g., networked, or clustered) with other computation devices to perform the functions described herein. And even though only one instance of each component is shown in FIG. 6, a skilled person in the art will understand that apparatus 600 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:
1. An apparatus, comprising:
one or more processors configured to:
obtain a source medical image that includes an object of interest and a background area surrounding the object of interest, wherein the object of interest and the background area exhibit a contrast in the source medical image;

determine, from the source medical image, a first plurality of pixels associated with the object of interest and a second plurality of pixels associated with the background area, wherein the first plurality of pixels has respective first pixel values and the second plurality of pixels has respective second pixel values; and generate a target medical image based on the first plurality of pixels and the second plurality of pixels so as to enhance the contrast between the object of interest and the background area in the target medical image, wherein the one or more processors are configured to enhance the contrast between the object of interest and the background area by adjusting at least the first pixel values of the first plurality of pixels or the second pixel values of the second plurality of pixels.

2. The apparatus of claim 1, wherein the one or more processors are configured to determine a segmentation mask associated with the object of interest and determine the first plurality of pixels and the second plurality of pixels based on the segmentation mask.

3. The apparatus of claim 2, wherein the one or more processors are configured to determine the segmentation mask using an artificial neural network or an image filter.

4. The apparatus of claim 2, wherein adjusting at least the first pixel values of the first plurality of pixels or the second pixel values of the second plurality of pixels comprises adjusting each of the first pixel values or the second pixel values by a constant amount.

5. The apparatus of claim 2, wherein adjusting at least the first pixel values of the first plurality of pixels or the second pixel values of the second plurality of pixels comprises applying a sharpening filter to the first plurality of pixels.

6. The apparatus of claim 2, wherein the segmentation mask indicates a respective probability that each of the first plurality of pixels belongs to the object of interest, and wherein adjusting at least the first pixel values of the first plurality of pixels or the second pixel values of the second plurality of pixels comprises:
  selecting at least a subset of the first plurality of pixels based on the respective probability that each of the first plurality of pixels belongs to the object of interest;
  determining a maximum pixel value among the selected pixels; and
  adjusting the pixel value of each of the selected pixels based on the maximum pixel value and the respective probability that each of the selected pixels belongs to the object of interest.

7. The apparatus of claim 1, wherein the one or more processors are configured to separate the source medical image into a first layer and a second layer, the first layer including the object of interest, the second layer including the background area, and wherein the one or more processors are configured to determine the first plurality of pixels based on the first layer and determine the second plurality of pixels based on the second layer.

8. The apparatus of claim 7, wherein the one or more processors are further configured to determine respective weights of the first layer and the second layer in the source medical image, and enhance the contrast between the object of interest and the background area by increasing the weight of the first layer in the target medical image or decreasing the weight of the second layer in the target medical image.

9. The apparatus of claim 8, wherein increasing the weight of the first layer in the target medical image comprises multiplying the respective first pixel values of the first plurality of pixels in the target medical image by a value that is greater than the weight of the first layer in the source medical image, and wherein decreasing the weight of the second layer in the target medical image comprises multiplying the respective second pixel values of the second plurality of pixels in the target medical image by a value that is smaller than the weight of the second layer in the source medical image.

10. The apparatus of claim 7, wherein the one or more processors are configured to separate the source medical image into the first layer and the second layer using a machine learned (ML) model, and wherein the first layer comprises a segmentation mask that indicates which pixels of the source medical image belong to the object of interest.

11. The apparatus of claim 10, wherein the ML model is trained using paired medical images that include a first medical image and a second medical image, the first medical image includes a depiction of the object of interest at a first time, the second medical image includes a depiction of the object of interest at a second time, and the ML model is trained based on at least a motion of the object of interest from the first time to the second time.

12. The apparatus of claim 1, wherein the source medical image includes an X-ray image and wherein the object of interest has a tubular structure.

13. A method of image enhancement, the method comprising:
  obtaining a source medical image that includes an object of interest and a background area surrounding the object of interest, wherein the object of interest and the background area exhibit a contrast in the source medical image;
  determining, from the source medical image, a first plurality of pixels associated with the object of interest and a second plurality of pixels associated with the background area, wherein the first plurality of pixels has respective first pixel values and the second plurality of pixels has respective second pixel values; and
  generating a target medical image based on the first plurality of pixels and the second plurality of pixels so as to enhance the contrast between the object of interest and the background area in the target medical image, wherein the contrast between the object of interest and the background area is enhanced by adjusting at least the first pixel values of the first plurality of pixels or the second pixel values of the second plurality of pixels.

14. The method of claim 13, further comprising determining a segmentation mask associated with the object of interest, wherein the first plurality of pixels and the second plurality of pixels are determined based on the segmentation mask.

15. The method of claim 14, the segmentation mask is determined using an artificial neural network or an image filter.

16. The method of claim 14, wherein adjusting at least the first pixel values of the first plurality of pixels or the second pixel values of the second plurality of pixels comprises adjusting each of the first pixel values or the second pixel values by a constant amount, or applying a sharpening filter to the first plurality of pixels.

17. The method of claim 14, wherein the segmentation mask indicates a respective probability that each of the first plurality of pixels belongs to the object of interest, and wherein adjusting the first pixel values of the first plurality of pixels comprises:
  selecting at least a subset of the first plurality of pixels based on the respective probability that each of the first plurality of pixels belongs to the object of interest;

determining a maximum pixel value among the selected pixels; and adjusting the pixel value of each of the selected pixels based on the maximum pixel value and the respective probability that each of the selected pixels belongs to the object of interest.

18. The method of claim 13, further comprising separating, using a machine-learned (ML) model, the source medical image into a first layer and a second layer, wherein the first layer includes the object of interest, the second layer includes the background area, the first plurality of pixels is determined based on the first layer, and the second plurality of pixels is determined based on the second layer.

19. The method of claim 18, further comprising determining respective weights of the first layer and the second layer in the source medical image, wherein the contrast between the object of interest and the background area is enhanced by increasing the weight of the first layer in the target medical image or decreasing the weight of the second layer in the target medical image.

20. The method claim 18, wherein the ML model is trained using paired medical images that include a first medical image and a second medical image, the first medical image includes a depiction of the object of interest at a first time, the second medical image includes a depiction of the object of interest at a second time, and the ML model is trained based on at least a motion of the object of interest from the first time to the second time.

* * * * *